(12) United States Patent
Bouillet et al.

(10) Patent No.: US 7,856,503 B2
(45) Date of Patent: Dec. 21, 2010

(54) METHOD AND APPARATUS FOR DYNAMIC CONTENT GENERATION

(75) Inventors: Eric Bouillet, Englewood, NJ (US); Parijat Dube, Yorktown Heights, NY (US); Zhen Liu, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 11/551,034

(22) Filed: Oct. 19, 2006

(65) Prior Publication Data

US 2008/0098115 A1    Apr. 24, 2008

(51) Int. Cl.
   *G06F 15/16* (2006.01)
(52) U.S. Cl. ...................................... 709/227
(58) Field of Classification Search .......... 709/227–229
   See application file for complete search history.

(56) References Cited

U.S. PATENT DOCUMENTS

| | | | | |
|---|---|---|---|---|
| 5,835,893 A | * | 11/1998 | Ushioda | 704/257 |
| 6,023,677 A | * | 2/2000 | Class et al. | 704/254 |
| 7,039,623 B1 | * | 5/2006 | Keeley | 706/46 |
| 7,366,097 B2 | * | 4/2008 | Zuberi | 370/231 |
| 7,558,823 B2 | * | 7/2009 | Beers et al. | 709/205 |
| 7,660,705 B1 | * | 2/2010 | Meek et al. | 703/2 |
| 2005/0060647 A1 | * | 3/2005 | Doan et al. | 715/514 |
| 2005/0075877 A1 | * | 4/2005 | Minamino et al. | 704/254 |
| 2005/0203738 A1 | * | 9/2005 | Hwang | 704/243 |
| 2005/0267945 A1 | * | 12/2005 | Cohen et al. | 709/215 |
| 2006/0101048 A1 | * | 5/2006 | Mazzagatti et al. | 707/101 |
| 2006/0109273 A1 | * | 5/2006 | Rams et al. | 345/473 |

\* cited by examiner

*Primary Examiner*—Ashok B Patel
*Assistant Examiner*—Joseph Gazda

(57) ABSTRACT

One embodiment of the present method and apparatus for synthesizing a data stream includes retrieving meta data from at least one decision tree, the decision tree comprising a plurality of interconnected nodes, and generating the data stream in accordance with the meta data.

19 Claims, 4 Drawing Sheets

METHOD AND APPARATUS FOR DYNAMIC CONTENT GENERATION

REFERENCE TO GOVERNMENT FUNDING

This invention was made with Government support under Contract No. H98230-04-3-0001 awarded by the U.S. Department of Defense. The Government has certain rights in this invention.

FIELD OF THE INVENTION

The present invention relates generally to data stream processing applications and relates more particularly to the synthesis of simulated data for use in testing Internet applications.

BACKGROUND

A wealth of Internet applications offer unprecedented opportunities for the enhancement of collaborative environments by enabling users to exchange, organize and search through vast amounts of information. At the same time, new challenges are inevitably presented in harnessing the capabilities of these applications, while preventing their misuse. It is thus important to develop systems and tools that allow users to understand and make the most efficient and secure use of these applications.

Such tools and methods typically rely on test data generated using simulated information. Thus, in turn, it is important to be able to simulate information exchange resulting from the interactions of millions of individuals in a manner that is statistically and semantically realistic, reproducible and controllable. Conventional methods for simulating test information, however, tend to be limited with regard to the types of data used to generate the simulated information, as well as with regard to the types of activities that may be tested.

Thus, there is a need in the art for a method and apparatus for dynamic content generation.

SUMMARY OF THE INVENTION

One embodiment of the present method and apparatus for synthesizing a data stream includes retrieving meta data from at least one decision tree, the decision tree comprising a plurality of interconnected nodes, and generating the data stream in accordance with the meta data.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for dynamic content generation. Embodiments of the present invention enable the creation of artificial data streams that are statistically and semantically equivalent to original data streams used for statistical and semantic information analysis. The artificial data streams may be used, for example, to test Internet applications, so that more efficient and effective use of the applications can be achieved.

Embodiments of the present invention operate on a generic data structure that represents content, and use data derived from this generic data structure to synthesize the artificial data streams. The data structure, which is described in further detail below, comprises: (1) a set of meta data content; and (2) spatial and temporal statistical dependencies among the meta data content. Within the context of the present invention, "meta data" content is understood to be a partial, high-level representation of the content in a particular programming language. For example, meta data may comprise an extensible markup language (XML) record that contains a word, or a feature vector describing a human voice with linear Prediction Cepstrum Coefficients. According to the present invention, such meta data may be used to generate one or more of a variety of different types of data streams. For example, the exemplary meta data described above could be fed to a text-to-speech synthesis application that translates the meta data into a waveform and streams the waveform as Voice over Internet Protocol (VoIP)/Real-time Transport Protocol (RTP) packets. Alternatively, the textual representation of the same exemplary meta data could be fed to a messaging emulator that translates the meta data into a chat message.

Moreover, embodiments of the present invention make use of data factories. Within the context of the present invention, a "data factory" is understood to be any module that is capable of translating a meta data content representation into an actual data stream (e.g., such as translating meta data content into a waveform or a chat message). Meta data content is fed piecewise to various data factories, according to specified spatial and temporal statistical characteristics. For example, meta data comprising two or more words can be further combined into meta data comprising a sentence, according to probabilities that words appear in given sequences (e.g., using an N-gram model), and potentially with temporal and contextual dependencies (e.g., use different N-gram models for written and spoken sentences). Meta data comprising sentences can be further combined into meta data comprising paragraphs, and so on.

Figure 1:
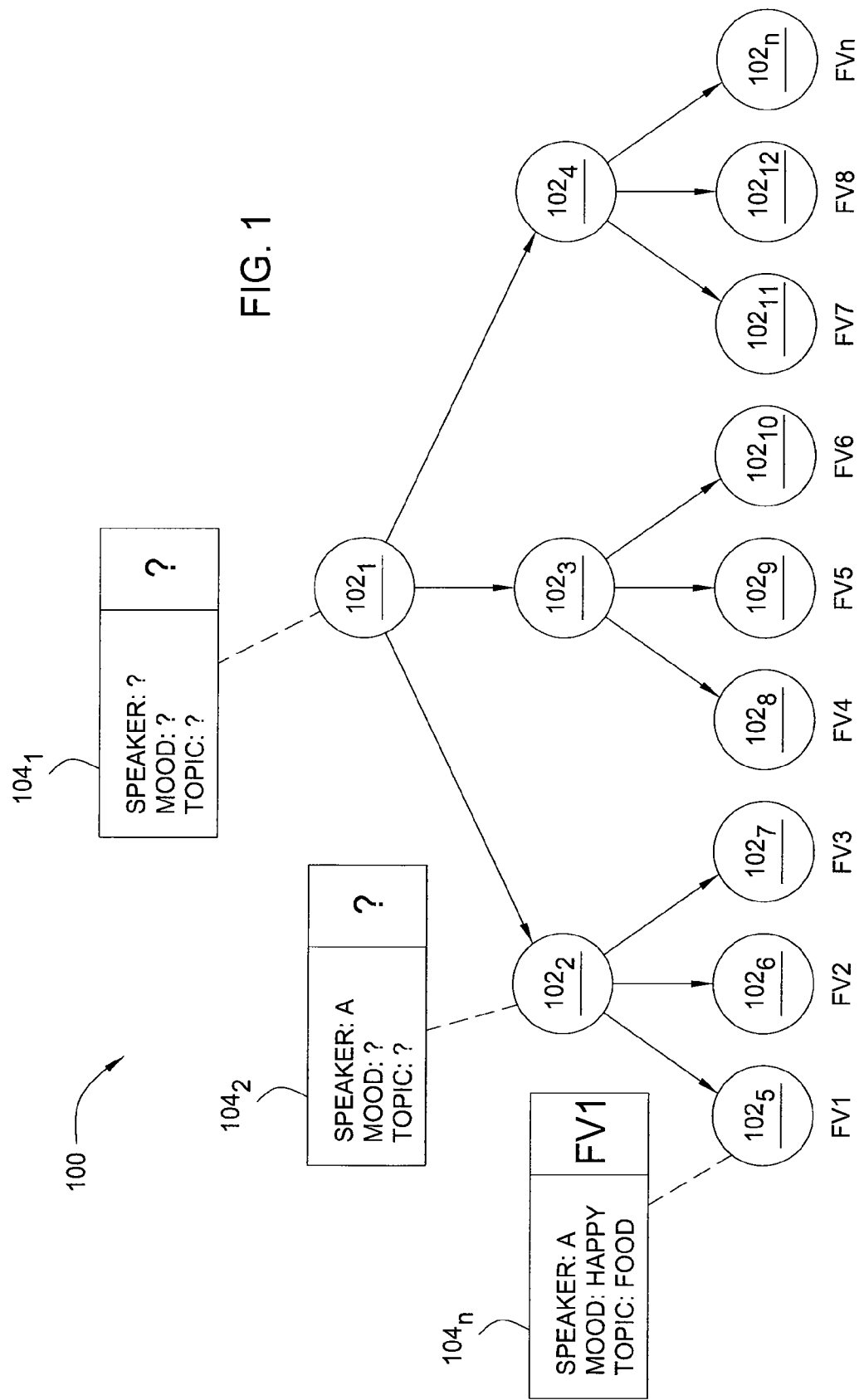
FIG. 1 is a schematic diagram illustrating one embodiment of a content model for structuring meta data information in a flexible and compact manner, according to the present invention.

FIG. 1 is a schematic diagram illustrating one embodiment of a content model for structuring meta data information in a flexible (i.e., not limited in terms of semantic and statistical representation) and compact manner, according to the present invention. Specifically, the content model is structured as one or more decision trees 100. As an example, the decision tree 100 has been illustrated for use in a VoIP application; however, those skilled in the art will appreciate that such details have been provided only as an example to assist explanation, and in no way limit application of the present invention and of the illustrated content model.

As illustrated, the decision tree 100 comprises a plurality of interconnected nodes $102_1$-$102_n$ (hereinafter collectively referred to as "nodes 102"). Some of these nodes 102 are root nodes (i.e., node $102_1$ in FIG. 1), some of the nodes 102 are branching nodes, some of the nodes 102 are transform nodes and some of the nodes 102 are leaf nodes (i.e., nodes $102_5$, $102_6$, $102_7$, $102_8$, $102_9$, $102_{10}$, $102_{11}$, $102_{12}$ and $102_n$). In one embodiment, any node 102 that is not a leaf node can be programmed to behave as a branching node and/or a transform node. The nodes 102 all conform to a common set of Application Programming Interfaces (APIs), with various methods for retrieving content and writing the retrieved content to buffers from where it can be processed by one or more data factories.

Branching nodes 102 provide logic for branching. That is, branching nodes 102 allow content selection with respect to given branching logics. For example, in one embodiment, a branching logic may comprise one or more of: a dictionary (e.g., in which branching is performed according to independent probabilities), an N-gram model (e.g., allowing probabilistic content selection conditioned on a history of up to N last branching decisions), a script (e.g., in which branching is executed according to a given sequence), a schedule (e.g., in which branching is conditioned on a current simulation time) or, more generally, a select (e.g., in which branching is dependent on an outcome of any random event). The select logic is sufficiently versatile that it can be used to generate other logics as well; however, other dedicated logics are necessary to achieve the desired tradeoff between efficiency and versatility.

Transform nodes 102 have the ability to modify content generated by a child node before passing the content back to their respective parent nodes. For example, in one embodiment, a transform logic may comprise one or more of: content concatenation, encapsulation (e.g., encapsulation into an IP header), arbitrary length repetition of the content (e.g., for generating random sentences), stack logic (e.g., for allowing persistence of randomly generated content and reuse across multiple streams and across time) or logics for creating structured content. The stack logic allows a programmer to, anywhere in a decision tree, push content generated by a child node into a stack and later refer to the stack to regenerate or remove the content.

Leaf nodes 102 are generator nodes that provide mechanisms for generating integers, real values, strings, dates and other types of arbitrary binary data. Various models may be implemented to generate constant content or random variables with prescribed distribution probabilities (e.g., uniform, exponential or normal). As an example, the leaf nodes 102 of FIG. 1 provide mechanisms for generating speech feature vectors (i.e., FV1, FV2, . . . , FVn) that identify specific speakers. As an exemplary use of these feature vectors, one of the feature vectors can be selected by a data factory for use in converting a text string into an audio stream with the voice of a speaker associated with the selected feature vector.

As will be described in further detail below, generation of data streams in accordance with a decision tree such as the decision tree 100 is achieved by traversing the decision tree, using the branching logic, to retrieve desired meta data from one or more leaf nodes 102. In one embodiment, the content model comprising one or more decision trees 100 is stored in an XML file and loaded into a runtime environment where the content model can be accessed by multiple data factories simultaneously. In the event that the content model comprises multiple decision trees, each decision tree is designated by a unique identifier (such as a name).

Figure 2:
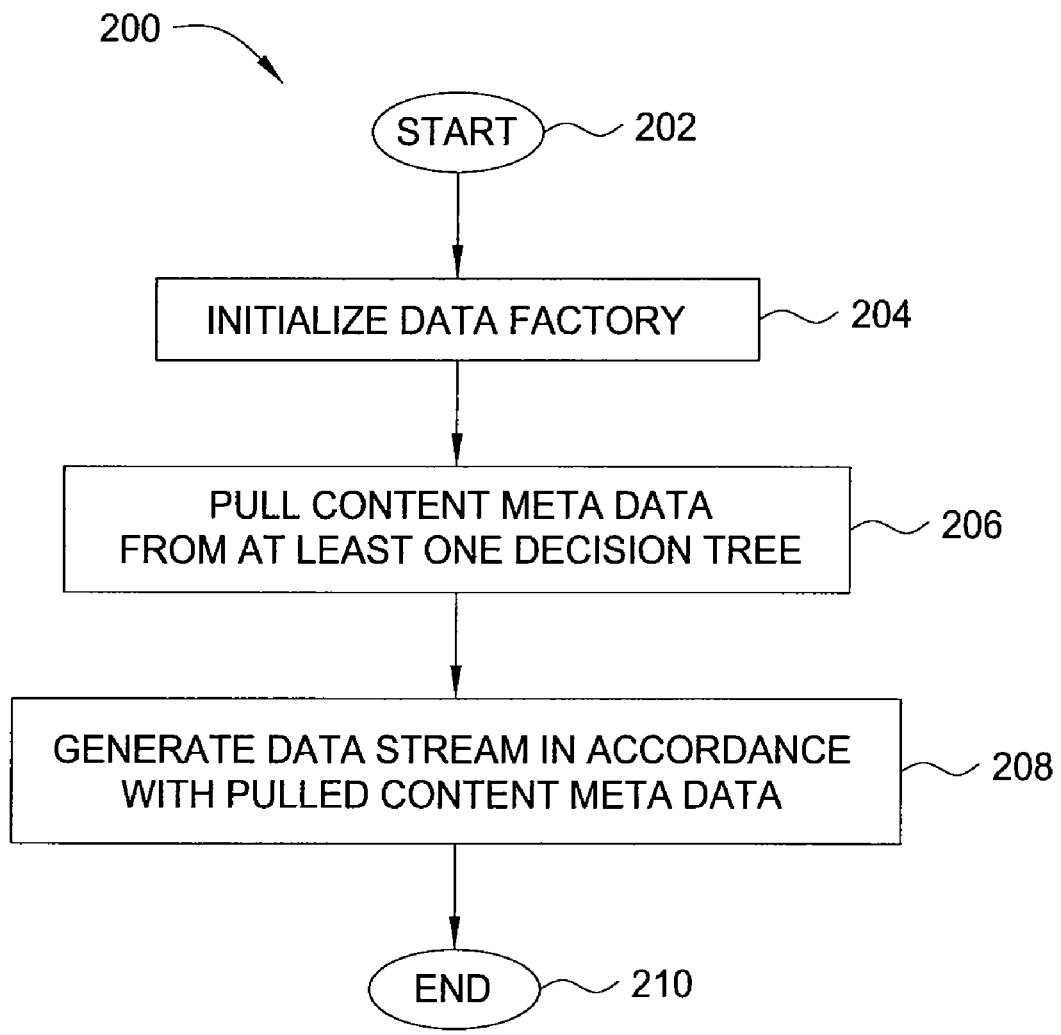
FIG. 2 is a flow diagram illustrating one embodiment of a method for generating a data stream, according to the present invention.

FIG. 2 is a flow diagram illustrating one embodiment of a method 200 for generating a data stream, according to the present invention. The method 200 may be implemented, for example, at a data factory that translates a meta data content representation into an actual data stream.

The method 200 is initialized at step 202 and proceeds to step 204, where the method 200 initializes a data factory. In one embodiment, initialization of a data factory includes binding the data factory to at least one specific decision tree, such as the decision tree 100 illustrated in FIG. 1. The bound decision tree(s) contain the meta data that the data factory may use to generate data streams. In one embodiment, the name of the decision tree(s) to which the data factory should be bound is provided in a configuration file or in the data factory's initialization method.

Once the data factory has been initialized, the method 200 proceeds to step 206 and pulls content meta data from at least one of the decision trees to which the data factory is bound. In one embodiment, meta data is pulled from a decision tree in accordance with an iterator associated with the data factory, where an iterator is a generalization of a pointer with "increment" logic. That is, an iterator is implemented to iterate over an arbitrarily long sequence of randomly generated elements. If an iterator points to one element in a range, it is possible to increment the iterator so that it points to the next element in the range. An iterator also maintains a local state, in order to determine the element to which it will point at a next increment. The operation of an iterator is described in further detail with respect to FIG. 3.

Once the content meta data has been pulled from the decision tree, the method 200 proceeds to step 208 and generates a data stream in accordance with the pulled content meta data. The method 200 then terminates in step 210.

Figure 3:
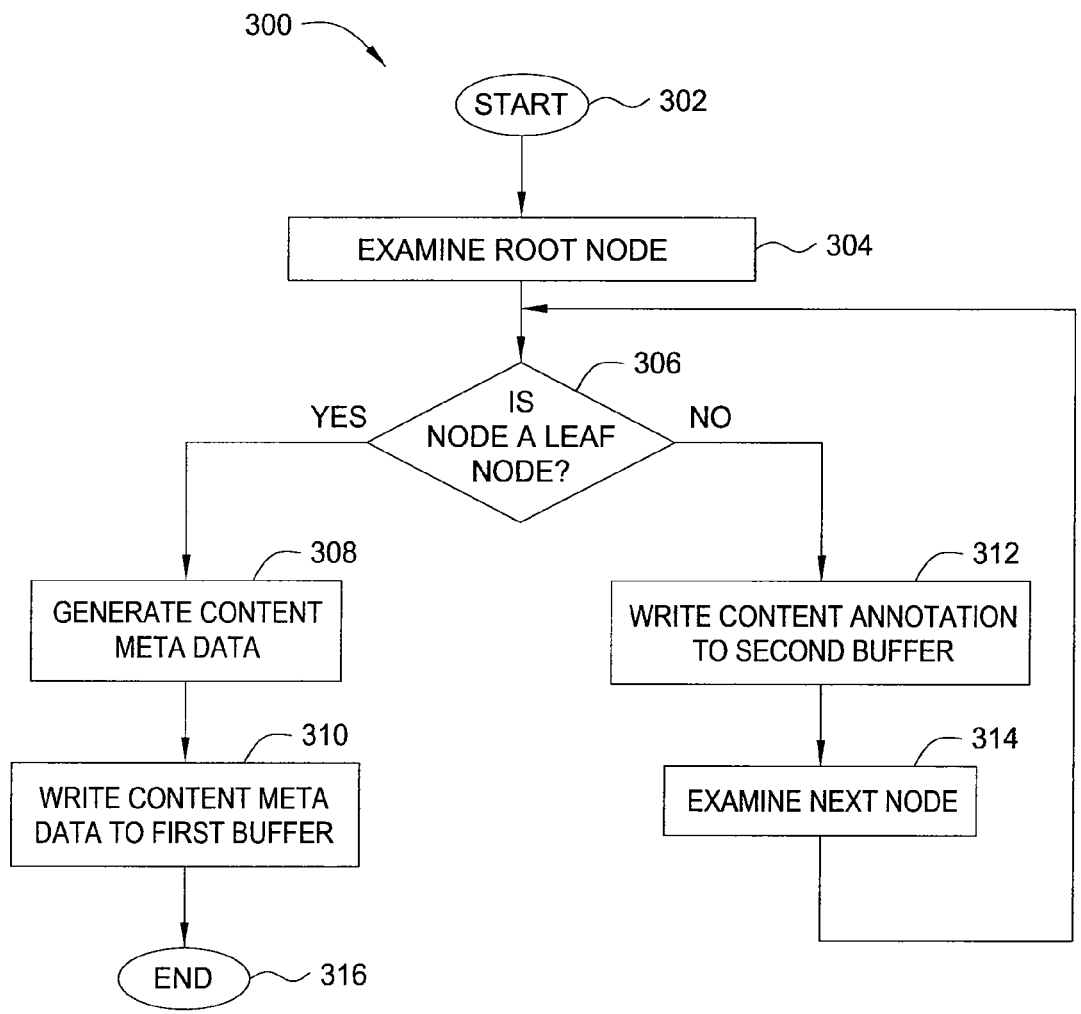
FIG. 3 is a flow diagram illustrating one embodiment of a method for pulling content meta data from a content model, in accordance with the present invention.

FIG. 3 is a flow diagram illustrating one embodiment of a method 300 for pulling content meta data from a content model, in accordance with the present invention. The method 300 may be implemented, for example, in accordance with step 206 of FIG. 2 by an iterator associated with a data factory.

The method 300 is initialized at step 302 and proceeds to step 304, where the method 300 examines the root node of the decision tree.

In step 306, the method 300 determines whether the root node is also a leaf node. If the method 300 concludes in step 306 that the root node is a leaf node, the method 300 proceeds to step 308 and generates content meta data before writing the generated content meta data to a first buffer in step 310. As described above, the content meta data in the first buffer may be used by a data factory to create actual payloads and protocol headers of data streams. The method 300 then terminates in step 316.

Alternatively, if the method 300 concludes in step 306 that the root node is not a leaf node, the method 308 proceeds to step 312 and writes content annotation to a second buffer. This content annotation provides information about the decision path taken by the method 300 through the decision tree and shows how content meta data is obtained. For example, referring back to FIG. 1, content annotations $104_1$-$104n$ (hereinafter collectively referred to as "content annotations 104") comprise contextual information indicating the identity of a speaker, the speaker's mood and the conversation topic associated with a selected feature vector (embodied in a leaf node 102). In one embodiment, the content annotation is logged into a file. For instance, considering FIG. 1 as an example, the content annotation may be appended to a VoIP packet. In another embodiment, the content annotation is sent to a different channel, where the content annotation can be used for benchmarking purposes (e.g., as a ground truth to benchmark the analytics of a tested application). In one embodiment, the method 300 also writes content annotation to the second buffer when a leaf node is encountered. In an alternative embodiment, content annotation is created by the parent node of the current node, in which case the annotation is attached to the arc(s) connecting the parent node to the current node (and not to the current node, per se).

In step 314, the method 300 examines the next node in the decision tree, in accordance with any branching logic specified by the current node. The method 300 then returns to step 306 and proceeds as described above depending on whether or not the next node is a leaf node.

Thus, an iterator follows a decision path through a decision tree, where the decision path results from the logics of the traversed nodes, until the iterator reaches a leaf node. A complete decision tree traversal, from root node to leaf node, is executed at each atomic increment of the iterator. As a consequence, the iterator iterates over a sequence of meta data content that is randomly generated by the leaf nodes of the decision tree.

In order to generate content annotations, a programmer must specify a list of content annotations for a data factory's iterator and for at least some of the nodes of the content model. In one embodiment, content annotations take the form of: (field name, field value), where the field name is any string, and the field value is a macro that returns a value. The field value macro conforms to the same paradigm and encoding as the decision tree used to generate the content meta data. Thus, as an iterator traverses a decision tree, each traversed node is checked for annotation fields that have the same field name as the iterator's annotations, and when a matching field name is found, the values of the iterator's annotations are replaced with the values specified by the node's corresponding field value.

Representing content meta data in the form of a decision tree offers many advantages. For instance, the decision tree structure offers a unified schema for expressing complex statistical properties. This allows spatio-temporal correlations/synchronizations and different specifications of content (e.g., statistical properties like word length, sentence length or the like) to be captured. The compact nature of the content model also allows for easy implementation using powerful schematic languages like XML. The use of meta data content in the representation provides flexibility for the reuse and composition of different types of data streams from the same content model.

Additionally, the modular nature of the content model allows a representation to be easily extended to support new content meta data types and new statistical properties, because all nodes of a decision tree conform to a common API interface (from which new types of decision logic and new types of meta data can be derived). Moreover, a decision tree can be extended with dedicated decision logic that is optimized to enable efficient and compact representation and fast (e.g., substantially real time) meta data content generation.

The content model also supports "free form" annotation of content meta data, which can be used to create user-configurable logs of what content is generated and how it is generated. This information may be useful when executing benchmarking algorithms that deal with content analytics, as this feature enables a user to lie, mislead or be vague about generated content.

In addition, the content model of the present invention is easily scalable, as content synthesis using a decision tree can be implemented in a thread-safe manner. That is, a single decision tree may be accessed simultaneously by multiple data factories through their respective iterators. However, since iterators locally maintain state information when making decisions, simultaneous access is multithread-safe and does not result in substantial performance degradation.

Figure 4:
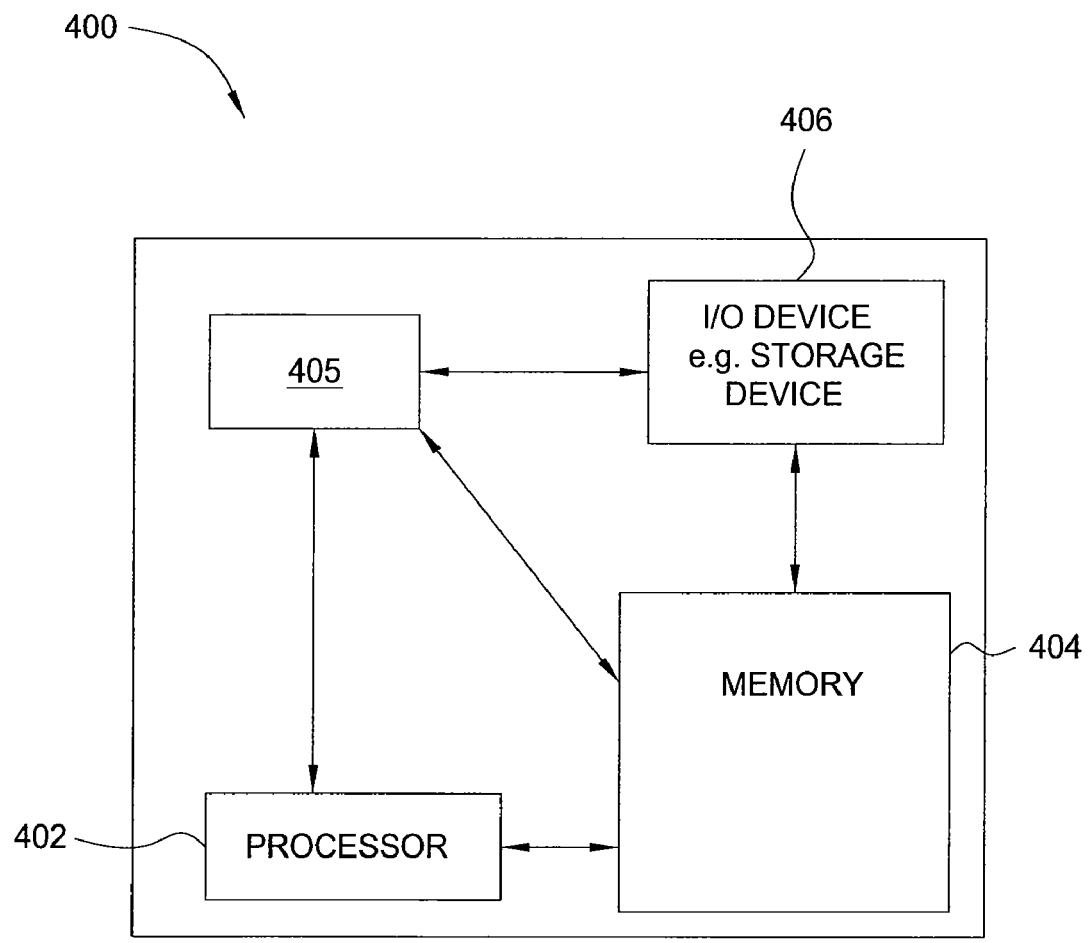
FIG. 4 is a high level block diagram of the content synthesis method that is implemented using a general purpose computing device.

FIG. 4 is a high level block diagram of the content synthesis method that is implemented using a general purpose computing device 400. In one embodiment, a general purpose computing device 400 includes a processor 402, a memory 404, a content synthesis module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the content synthesis module 405 can be implemented as a physical device or subsystem that is coupled to a processor through a communication channel.

Alternatively, the content synthesis module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the content synthesis module 405 for generating artificial data streams described herein with reference to the preceding Figures can be stored on a computer readable medium or carrier (e.g., RAM, magnetic or optical drive or diskette, and the like).

Thus, the present invention represents a significant advancement in the field of testing and benchmarking intelligent information processing systems, such as data stream processing systems. Embodiments of the present invention enable the creation of artificial data streams that are statistically and semantically equivalent to original data streams used to statistical and semantic information analysis. The artificial data streams may be used, for example, to test (distributed) information processing applications, so that more efficient and effective use of the applications can be achieved.

While the foregoing is directed to the preferred embodiment of the present invention, other and further embodiments of the invention may be devised without departing from the basic scope thereof, and the scope thereof is determined by the claims that follow.

The invention claimed is:

1. A method for synthesizing an artificial data stream, the method comprising:
    retrieving meta data from at least one decision tree, the at least one decision tree comprising a plurality of interconnected nodes arranged in a hierarchy, wherein each of the plurality of interconnected nodes implements a logic for generating content, and
    wherein the plurality of interconnected nodes comprises:
        at least one root node occupying a highest level of the hierarchy; and
        a plurality of leaf nodes, each of the plurality of leaf nodes occupying a level of the hierarchy that is at least one level below the highest level; and
    generating the artificial data stream in accordance with the meta data, wherein the artificial data stream simulates one or more real data streams.

2. The method of claim 1, wherein at least one of the plurality of interconnected nodes implements a branching logic that specifies a manner in which the at least one decision tree is to be traversed.

3. The method of claim 2, wherein the branching logic comprises at least one of: a dictionary, an N-gram model, a script, a schedule or a select.

4. The method of claim 1, wherein at least one of the plurality of interconnected nodes implements a transform logic that allows a modification of content generated by a child node in the hierarchy.

5. The method of claim 4, wherein the transform logic comprises at least one of: content concatenation, encapsulation, arbitrary length repetition of content, stack logic or a logic for creating structured content.

6. The method of claim 1, wherein at least one of the plurality of interconnected nodes implements a logic for generating arbitrary binary data.

7. The method of claim 1, wherein the retrieving comprises:
    traversing the at least one decision tree from a root node occupying a highest level of the hierarchy to a leaf node occupying a level of the hierarchy that is at least one level below the highest level, to create a decision path; and
    generating content for the data stream in accordance with mechanisms provided by the leaf node.

8. The method of claim 7, wherein the traversing comprises:
    writing the content to a first buffer, if a current node in the decision path is a leaf node; and
    writing a content annotation to a second buffer, if the current node in the decision path is not a leaf node.

9. The method of claim 8, further comprising:
    writing a content annotation to the second buffer, if the current node in the decision path is a leaf node.

10. The method of claim 8, wherein the content annotation provides information about the decision path.

11. The method of claim 8, wherein the writing the content annotation comprises:
    identifying, at the current node in the decision path, a node field name that corresponds to a field name of an iterator; and
    replacing a field value of the iterator, the field value of the iterator corresponding to the field name of the iterator, with a field value corresponding to the node field name.

12. The method of claim 8, wherein the first buffer and the second buffer are accessible by a data factory.

13. A non-transitory computer readable medium containing an executable program for synthesizing an artificial data stream, where the program performs steps comprising:
    retrieving meta data from at least one decision tree, the at least one decision tree comprising a plurality of interconnected nodes arranged in a hierarchy, wherein each of the plurality of interconnected nodes implements a logic for generating content, and wherein the plurality of interconnected nodes comprises:
        at least one root node occupying a highest level of the hierarchy; and
        a plurality of leaf nodes, each of the plurality of leaf nodes occupying a level of the hierarchy that is at least one level below the highest level; and
    generating the artificial data stream in accordance with the meta data, wherein the artificial data stream simulates one or more real data streams.

14. The non-transitory computer readable medium of claim 13, wherein the retrieving comprises:
    traversing the at least one decision tree from a root node occupying a highest level of the hierarchy to a leaf node occupying a level of the hierarchy that is at least one level below the highest level, to create a decision path; and
    generating content for the data stream in accordance with mechanisms provided by the leaf node.

15. The non-transitory computer readable medium of claim 14, wherein the traversing comprises:
    writing the content to a first buffer, if a current node in the decision path is a leaf node; and
    writing a content annotation to a second buffer, if the current node in the decision path is not a leaf node.

16. The non-transitory computer readable medium of claim 15, wherein writing the content annotation comprises:
    identifying, at the current node in the decision path, a node field name that corresponds to a field name of an iterator; and
    replacing a field value of the iterator, the field value of the iterator corresponding to the field name of the iterator, with a field value corresponding to the node field name.

17. System for synthesizing an artificial data stream, said system comprising:
    means for retrieving meta data from at least one decision tree, the at least one decision tree comprising a plurality of interconnected nodes arranged in a hierarchy wherein each of the plurality of interconnected nodes implements a logic for generating content, and wherein the plurality of interconnected nodes comprises:
        at least one root node occupying a highest level of the hierarchy; and
        a plurality of leaf nodes, each of the plurality of leaf nodes occupying a level of the hierarchy that is at least one level below the highest level; and
    means for generating the artificial data stream in accordance with the meta data, wherein the artificial data stream simulates one or more real data streams.

18. The method of claim 1, wherein the retrieving is performed under a direction of an iterator.

19. The method of claim 18, wherein the iterator maintains a local state.

* * * * *